United States Patent

Heckendorf

[11] Patent Number: 6,102,130
[45] Date of Patent: Aug. 15, 2000

[54] SOIL PREPARATION FOR PLANTING TOOL AND METHOD

[76] Inventor: David W. Heckendorf, P.O. Box 334 Yandina, Queensland 4561, Australia

[21] Appl. No.: 09/080,160

[22] Filed: May 15, 1998

[51] Int. Cl.[7] .................................................. A01B 33/06
[52] U.S. Cl. ............................................. 172/111; 172/25
[58] Field of Search ............................. 172/23, 25, 54.5, 172/55, 56, 57, 59, 41, 48, 99, 110, 111

[56] References Cited

U.S. PATENT DOCUMENTS

| | | | |
|---|---|---|---|
| 2,489,633 | 11/1949 | Fulgham | 172/110 X |
| 2,755,718 | 7/1956 | Arndt | 172/111 |
| 3,130,794 | 4/1964 | Lovell et al. | 172/111 |
| 3,199,607 | 8/1965 | Granius | 172/111 |
| 4,854,404 | 8/1989 | Weber et al. | 172/111 X |
| 5,146,997 | 9/1992 | Korin | 172/42 |
| 5,222,563 | 6/1993 | Van Horlick | 172/111 |
| 5,850,882 | 12/1998 | Link | 172/41 |

*Primary Examiner*—Victor Batson
*Attorney, Agent, or Firm*—Quarles & Brady LLP

[57] ABSTRACT

A soil preparation-for-planting tool which has a drive motor with a rotatable portion including a central shaft with a distal cutting end, with the central shaft further having secured therewith an outwardly extending support to which is affixed one blade only, adapted to engage soil as it traverses around a central axis defined by the central shaft to divert into a central area soil, with the output shaft adapted to enter the soil first to locate dig and maintain the position of the shaft at a center of a proposed planting hole. The output shaft has toward its outer end one blade secured to rotate with the output shaft so as to effect a breaking of soil as it is rotated through the soil. The blade is of a shape and at an angle such that it will enter into soil by being rotated therethrough but upon being withdrawn, will be adapted to readily shed any soil.

12 Claims, 2 Drawing Sheets

SOIL PREPARATION FOR PLANTING TOOL AND METHOD

TECHNICAL FIELD

This invention relates to an apparatus for spot soil preparation for planting of growing plants.

It is well known that in order to prepare soil for planting plants such as trees of various types, the ground needs to be broken up so as to enable insertion of a relevant plant into the ground with some ease and to assist in the subsequent growth of roots of the plant.

The problem that this invention addresses however is that in the commercial business of planting trees, the spot digging and preparation of soil requires that a selected site can be prepared in a minimal amount of time.

This time may include time required for removal of debris above the soil, introduction of the digging equipment into the soil, a digging process and then effective removal and transfer to a next spot site.

BACKGROUND OF THE INVENTION

Attempts have been made previously to achieve all of this with a very rapid turnaround time but such attempts have been generally unsuccessful either by reason of the time achieved or because of the equipment would appear to be necessarily bulky.

Machines of the type we are discussing are large machines and might be supported typically from a hydraulic crane which then also provides a supply of power for a rotational drive motor for driving digging implements.

The problem then is to propose improvement which will assist in making site preparation for the planting of a plant quicker and more efficient than has hitherto been the case.

BRIEF SUMMARY OF THE INVENTION

In one form then the invention can be said to reside in a soil preparation-for-planting tool including:
  a central shaft supported to be rotatable about its elongate axis with a lowermost cutting end, and an uppermost part adapted to be drivably engaged by rotational drive means,
  the central shaft having secured thereto a radially outwardly extending support which is radially outwardly extending from the elongate axis of the shaft,
  one disc blade only being supported by the support,
  the disc blade being positioned and supported so as to engage soil with a peripheral cutting edge which will rotate about its own central axis while the blade as a whole is supported so as to traverse around the elongate axis of the central shaft, the concave side of the blade being on a side closest to the support, with the lowermost cutting end positioned relative to the cutting edge of the blade so as to enter the soil first.

In preference, the radially outwardly extending support has the one disc blade secured at or toward its outer end.

In preference, the radially outwardly extending support has toward its outer end, at least one blade secured to rotate with the radially outwardly extending support so as to effect a breaking of soil as it is rotated through the soil.

In preference, the blade is of a shape and held at an angle such that it will enter into soil as a result of being caused to follow a circular path with the axis being the axis of the central shaft.

In preference the blade, upon being withdrawn from the soil, is held at an angle that together with its shape assist in the shedding of any soil.

In preference, the one blade only adapted to engage soil as it transverses around a central axis is a concave disk which is supported so as to be rotatable about its own central axis as it is caused to traverse around the proposed planting location.

In preference, the blade is supported by a radially extending support which is comprised in combination of an outwardly extending arm that in turn supports a downwardly extending and trailing arm at the end of which there is a bearing supporting the concave disk such that the concave side of the disk is on a side closer to the output shaft.

In preference, the drive motor is comprised on a hydraulic motor and is adapted to be supported by a releasable interlocking support system.

In preference, the concave blade is shaped to include a scalloped outline around its periphery and it is supported so as to be slightly offset to its tangential direction as it is rotated around the planting location.

BRIEF DESCRIPTION OF THE DRAWINGS

These and other variations will be better understood when described with the assistance of drawings wherein.

DETAILED DESCRIPTION

Figure 1:
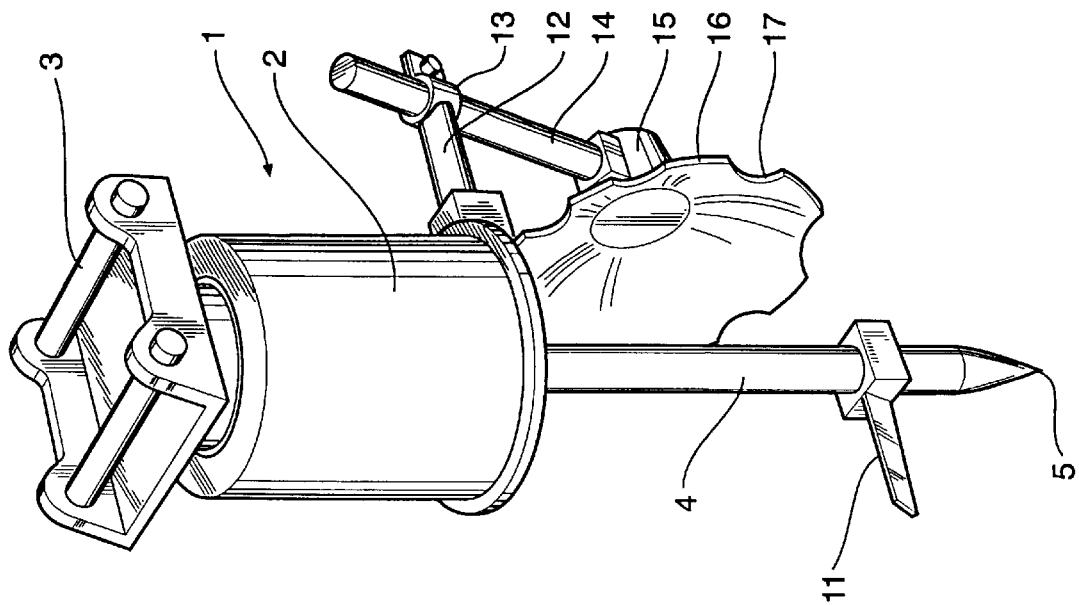
FIG. 1 is a perspective view of an assemblage according to the preferred embodiment.
Figure 2:
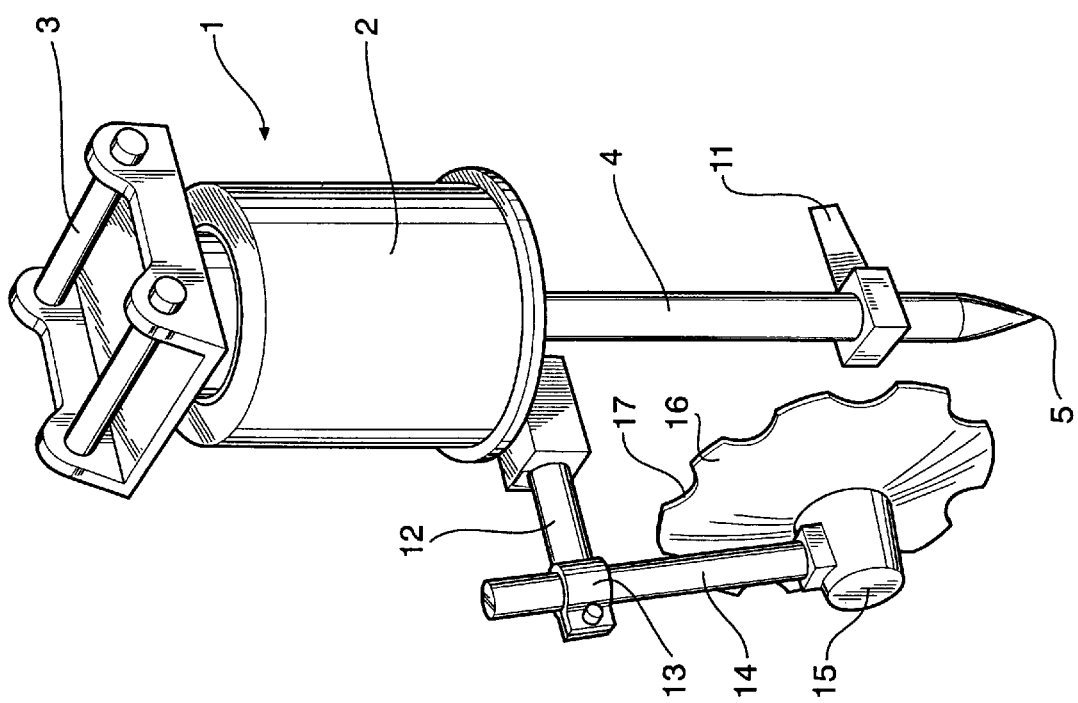
FIG. 2 is a perspective of the same embodiment of FIG. 1 from an opposite position.
Figure 4:
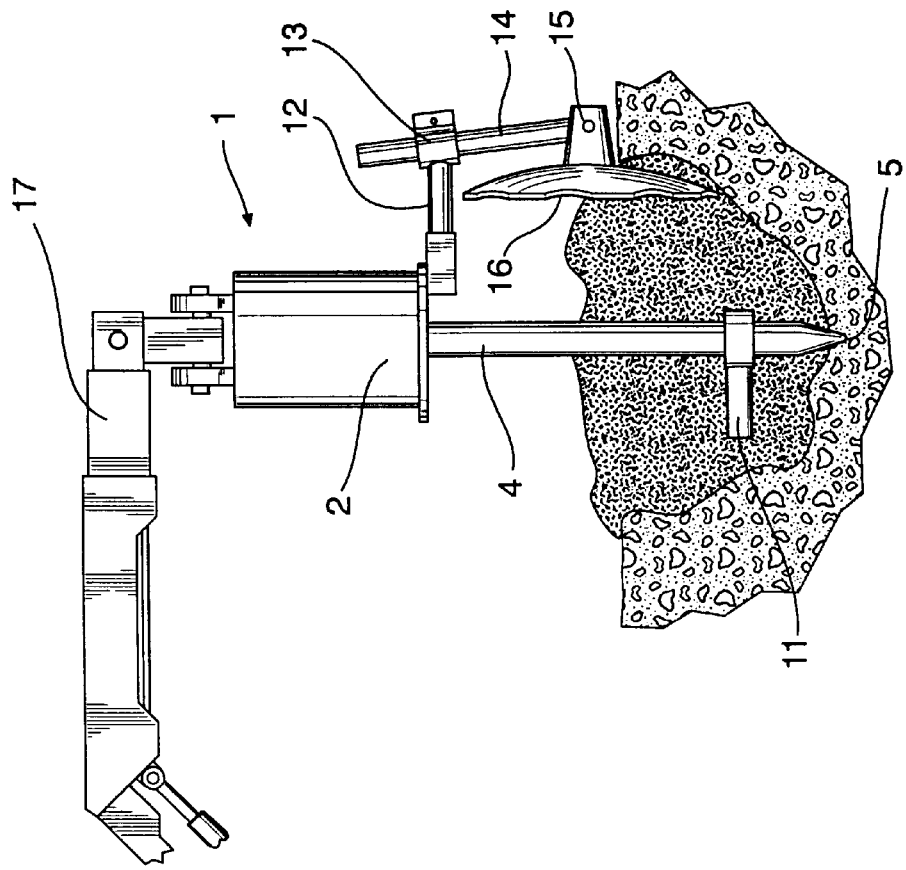
FIG. 4 is a side elevation of the same assemblage as in FIG. 3 except that there is a cross section through the earth showing the manner in which the earth is worked preparatory for planting of a plant by the apparatus.
Figure 3:
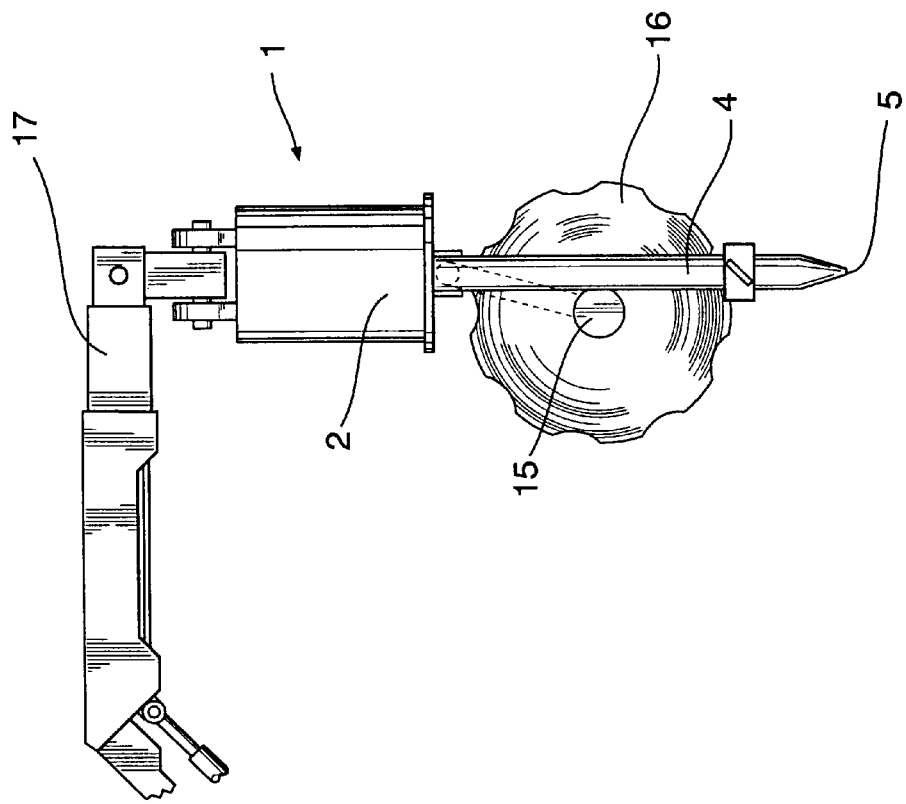
FIG. 3 is a side elevation of the same embodiment as shown in FIGS. 1 and 2 with however the assembly being supported through a quick release linkage to an hydraulic crane.

Referring to the drawings in detail, the tool 1 includes a motor 2 having at its upper end a quick connection linkage 3 by which it can be supported by a hydraulic crane shown in FIGS. 3 and 4 and at its lower end there are means to secure a central shaft 4 which is elongate and which has a central axis along its elongate direction so that the central shaft 4 will be rotatably drivable about this axis as desired by the motor 2.

At a distal end of the shaft 4 which is also a lowermost position during the normal use of the tool 1 there is a sharp chisel shape 5 welded to the end of the shaft 4 so that being fixed to the shaft 4 it will rotate with the central shaft 4.

A horizontal sub-soiling arm 11 is secured at an adjustable position up the shaft 4 so as to fracture the subsoil.

Secured so as to also rotate with the shaft 4 is an outwardly extending arm 12, at the end of which is a collar 13 holding, with clamping grip, rod 14 the lower end of which supports bearing 15.

Bearing 15 supports a shaft (which is not shown) to which is secured a concave rotary blade 16 with a scalloped periphery 17 which can rotate therefore by reason of the shaft being held within the bearing 15.

The motor 2 includes within its casing, a planetary step down gear so that the hydraulic motor is geared downwardly before driving the shaft 4 so as to be able to exert a higher force at lower speed.

How does this work then.

The tool assembly 1 is supported by a hydraulic crane 17 through a standard bucket quick hitch at 3.

Accordingly, in order to prepare the ground for planting, the tool is firstly supported by the hydraulic crane 17 so that it can be remotely controlled to push debris on the ground out of the way.

This can be achieved by ensuring that the disk or blade 16 is located in a position behind the shaft 4 so that the shaft 4 itself then is used forward of the disk or blade 16 to push out of the way fallen trees, stones or the like.

This has the first advantage that the shaft 4 can take most of the sideways torque or pressures and it will to some extent protect the much more vulnerable cutting disk or blade 16.

This is a first advantage of having only one disk, and it is also the advantage of having a central shaft where the blade can be located behind this when the tool is to be used for this preliminary procedure.

Once the site has been preliminarily cleared, the shaft 4 together with the disk 16 are then caused to rotate but of course, by reason of the distal cutting end of the shaft 4 is somewhat lower than any lowermost cutting edge of the disk 16, the shaft 4 will locate and start working the soil at a central location prior to the disk coming into contact with the earth.

The advantage of this then is that by the time the disk starts to come into contact with the soil, the shaft 4 has anchored itself to establish a central axial location, and the blade 16 once it starts to contact the soil is then caused to rotate at least once around the full circumference and slightly more than a full circumference so that by the time depth of the concave blade 16 is sufficient, it will have been able to circumnavigate the area capturing soil and diverting it into a central annular mound with sufficient depth for the full distance around the site.

At this stage, the tool can be simply lifted out and the concave blade 16 would normally be expected to also quickly shed any dirt.

The horizontal sub-soiling arm 11 further fractures central and lower areas of the cultivated spot without causing glazing of side walls of the fractured area. The horizontal sub-soiling arm 11 is slidably movable on the shaft 4 and typically positioned such that the chisel shape 5 is substantially below the arm 11. The horizontal sub-soiling arm 11 functions to anchor the shaft 4 in the soil and works the sub-soil, typically up to 1 meter in depth as the shaft 4 relates. If desired, for example in sandy soil, the horizontal sub-soiling arm 11 can be removed so that no working of the sub-soil occurs.

The concave blade 16 causes an annular mound around a central depression.

The apparatus then provides an extremely efficient tool for effecting preparation for planting of soil and in trials so far is coming very close to the target of ten second per prepared site which is to say in the order of ten to fifteen seconds in a majority of cases.

It will, to those readers who are familiar with this art, be readily apparent that the invention is being directed to large machines which are used for industrial applications such as forest replanting and where the diameter of the prepared site may be of the order of one meter or more in diameter.

While reference has been made to a specific preferred embodiment, the diameter of the prepared site, the extent to which the ground needs to be captured and pushed into an annular mound, and the extent to which a central aperture needs to be broken up to a large depth at a wider or lesser diameter will be decided for each application.

However, the invention is directed to a concept and features that can be added to this concept which can be used for a variety of different sizes and digging techniques.

For instance, the central shaft itself does not have to have in a broadest concept in accord with this invention radially extending blades or even one blade and the shape of these can vary significantly.

Further, when the radial blades are used, it has been found to be of significant advantage to have these shaped so as to simply cut their way through the ground and break this up accordingly but not to be such as to hold the soil when being withdrawn or once fully withdrawn from the soil.

This however is a factor related to the type of soil.

Using an hydraulic crane allows the tool to be used both for removing surface debris and although perhaps fallen trunks of trees and the like and in one form the invention can be said to reside in the combination of a tool when supported for manipulative control by a hydraulic crane.

Such manipulative control can include changing the axial direction of the tool so that it might be inclined to the vertical and it also includes control through hydraulic couplings to change the position of the blade which is otherwise positioned at a random position, to be behind a forward position when the shaft is to be used to engage and push away some larger obstacle.

The method of use of the tool includes lowering the tool so that the distal cutting end of a central shaft engages the soil and by rotation of this around its axis there is cause to cutting effect while there is downward pressure applied either by reason simply of the weight of the tool or by in addition to the weight of the tool, pressure applied from a support mechanism such as a hydraulic crane, then arranging that with the central shaft with its cutting end embedded sufficiently within soil at the location, causing a blade to move so as to engage increasingly, the soil at a selected distance from the central axis of the shaft, and to divert soil thereby into an annular mound which also has the additional effect of breaking up the surface soil at a larger radius from the axial center of the shaft then any cutting blade attached directly to the lower end of the shaft. When a sufficient depth has been achieved, the tool can be directly lifted out with rotation either continuing or being stopped.

What is claimed is:

1. A soil preparation-for-planting tool including:
   a drive motor driving a rotatable portion, said rotatable portion including a central shaft with a distal cutting end;
   an outwardly extending support secured to the central shaft; and,
   one blade only rotatably affixed to the extending support, the blade adapted to engage soil as the blade traverses around a central axis defined by the central shaft thereby diverting soil into a central area, the central shaft adapted to enter the soil first to locate, dig, and maintain the central shaft in a position at a center of a proposed planting hole.

2. A soil preparation-for-planting tool according to claim 1, wherein at least one substantially horizontal tyne is secured to an outer end of the central shaft to rotate with the central shaft so as to effect a breaking of the soil as the tyne is rotated through the soil.

3. A soil preparation-for-planting tool according to claim 1, wherein the blade is shaped and supported by the outwardly extended support to be at an angle on entry to the soil such that the blade will enter into the soil by being rotated therethrough.

4. A soil preparation-for-planting tool according to claim 1, further comprising a sub-soiling arm attached to and extending radially from the central shaft, the sub-soiling arm being located above a lowermost end of the central shaft.

5. A soil preparation-for-planting tool according to claim 1, wherein the outwardly extending support includes:
   an outwardly extending arm supporting the blade,
   a downwardly extending and trailing arm supported by the outwardly extending arm,
   a bearing attached to an end of the downwardly extending and trailing arm,
   a concave disk rotatably attached to the bearing so as to be rotatable about the central axis of the concave disk as the concave disk is caused to traverse around the proposed planting hole, the concave disk having a concave side facing the central shaft.

6. A soil preparation-for-planting tool including:
   a drive motor having a rotatable portion, said rotatable portion including a central shaft with a distal cutting end;
   an outwardly extending support secured to the central shaft;
   one blade only rotatably affixed to the extending support, the blade adapted to engage soil as the blade traverses around a central axis defined by the central shaft thereby diverting soil into a central area, the central shaft adapted to enter the soil first to locate, dig, and maintain the central shaft in a position at a center of a proposed planting hole; and,
   at least one substantially horizontal tyne secured to the central shaft toward an outer end of the output shaft, the at least one tyne rotating with the central shaft so as to effect a breaking of soil as the tyne is rotated through the soil.

7. A soil preparation-for-planting tool according to claim 6, wherein the blade is shaped and supported by the outwardly extended support to be at an angle on entry to the soil such that the blade will enter into the soil by being rotated therethrough.

8. A soil preparation-for-planting tool according to claim 6, wherein the blade is comprised of a concave disk rotatable about a central axis of the concave disk as the concave disk is caused to traverse around the proposed planting location.

9. A soil preparation-for-planting tool according to claim 6, wherein the outwardly extending support includes:
   an outwardly extending arm supporting the blade,
   a downwardly extending and trailing arm supported by the outwardly extending arm,
   a bearing attached to an end of the downwardly extending and trailing arm, supporting a concave disk having a concave side facing the central shaft.

10. A soil preparation-for-planting tool as in claim 6, wherein the drive motor is comprised of a hydraulic motor and is adapted to be supported by a releasable interlocking support system.

11. A soil preparation-for-planting tool as in claim 8, wherein a periphery of the concave disk includes a scalloped outline and the concave disk is supported to be slightly at an angle relative to a vertical axis defined by the concave disk as the concave disk is rotated around the planting location.

12. A soil preparation-for-planting tool according to claim 6, further comprising a sub-soiling arm attached to and extending radially from the central shaft, the sub-soiling arm being located above a lowermost end of the central shaft.

* * * * *